United States Patent
Keenan

(10) Patent No.: US 10,018,049 B2
(45) Date of Patent: Jul. 10, 2018

(54) BLADED DISC

(71) Applicant: ROLLS-ROYCE plc, London (GB)

(72) Inventor: Michael Philip Keenan, Sheffield (GB)

(73) Assignee: ROLLS-ROYCE plc, London (GB)

(*) Notice: Subject to any disclaimer, the term of this patent is extended or adjusted under 35 U.S.C. 154(b) by 151 days.

(21) Appl. No.: 15/011,561

(22) Filed: Jan. 31, 2016

(65) Prior Publication Data

US 2016/0245089 A1    Aug. 25, 2016

(30) Foreign Application Priority Data

Feb. 25, 2015 (GB) .................................. 1503105.7

(51) Int. Cl.
  *F01D 5/06* (2006.01)
  *F01D 5/34* (2006.01)
(52) U.S. Cl.
  CPC ............. *F01D 5/06* (2013.01); *F01D 5/34* (2013.01); *Y02T 50/671* (2013.01); *Y02T 50/673* (2013.01)
(58) Field of Classification Search
  CPC ... F01D 5/02; F01D 5/06; F01D 5/063; F01D 5/34; F04D 29/321
  USPC ................... 416/198 R, 201 R, 198 A
  See application file for complete search history.

(56) References Cited

U.S. PATENT DOCUMENTS 4,029,437 A * 6/1977 Aubry .................. F01D 5/06
                                                 403/375

FOREIGN PATENT DOCUMENTS

| DE | 10 2008 034 738 A1 | 1/2010 |
| EP | 1 180 579 A2 | 2/2002 |
| FR | 876.194 A | 10/1942 |

OTHER PUBLICATIONS

Jul. 31, 2015 Search Report issued in British Application No. 1503105.7.

* cited by examiner

*Primary Examiner* — Richard Edgar
(74) *Attorney, Agent, or Firm* — Oliff PLC

(57) ABSTRACT

A bladed disc for use in a turbine engine comprises: a central cob portion; a main diaphragm attached to, and extending around, the cob portion; a rim surrounding the main diaphragm; and two rows of blades attached to the rim.

9 Claims, 4 Drawing Sheets

BLADED DISC

Figure 1:
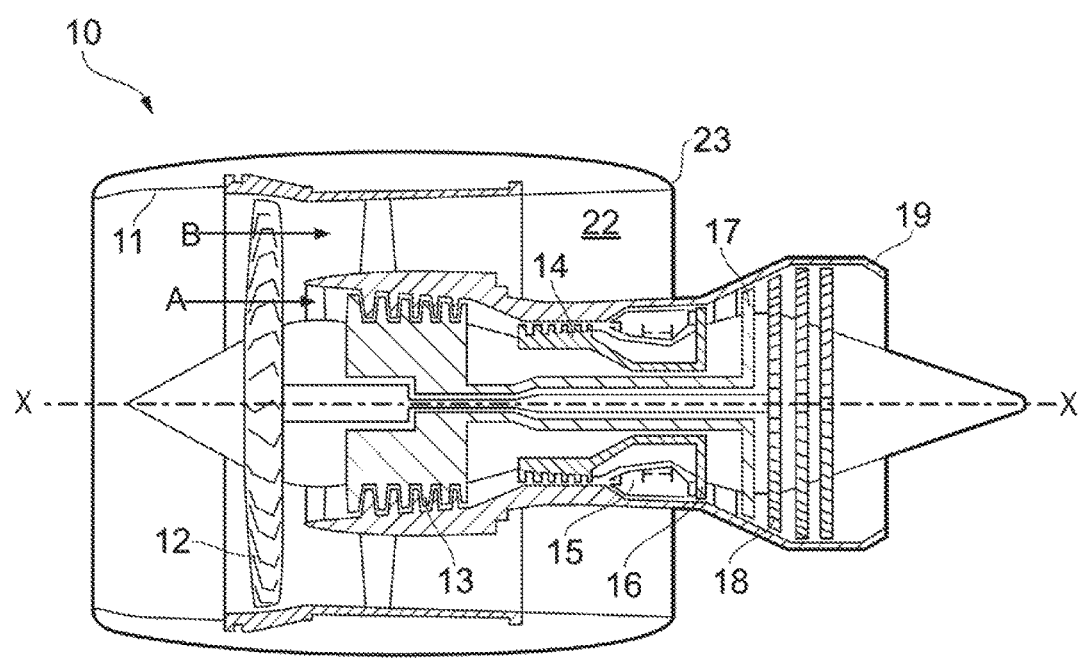

The disclosure relates to a bladed disc having multiple rows of blades.

Integrally bladed rotor discs, which are commonly termed "blisks" in the aerospace industry, are used in engine manufacture, and are characterized by lower weight and higher mechanical loadability, as well as by optimum flow guidance and high efficiency, as compared with conventional rotors with blades detachably mounted on the rotor disc. The integrally bladed discs may be manufactured by welding blades to a disc (e.g. using linear friction welding) or the bladed disc may be formed from a single source of material (e.g. by machining).

Currently engine compressors are designed to have multiple rows of blades (e.g. 6 or 8 rows), A bladed disc can form each row of blades. The rows of discs or bladed discs are welded together to form a compressor drum.

As such, whilst an individual bladed disc may have advantages over a conventional rotor with detachable blades, there is still complexity of manufacture in providing several bladed discs to form a compressor drum. The present invention aims to at least partially overcome this limitation and provide further advantages.

According to a first aspect of the invention there is provided a bladed disc for use in a turbine engine: a central cob portion; a main diaphragm attached to, and extending around, the cob portion; a rim surrounding the main diaphragm; and two rows of blades attached to the rim.

The blades can be attached to the rim via mini-diaphragms. Each blade can be attached to the rim by a separate mini-diaphragm, or a plurality of blades within a row can be attached to the rim by the same mini-diaphragm.

The two rows of blades can be positioned such that the centre of mass of the bladed disc is aligned with a centre line of the main diaphragm.

The rim can comprise two sides extending away from the main diaphragm, wherein one of said two rows of blades is attached to each one of the two sides. The mini-diaphragms can be configured to compensate for tilting of the blades caused by bending of the rim sides when the bladed disc is spun, by allowing the blades to tilt back to their original orientation.

The mini-diaphragms can be configured to bend by the same angle as the rim side supporting the mini-diaphragms, when the bladed disc is spun.

The thickness of the mini-diaphragms can be selected such that the blades remain the same radial orientation when the bladed disc is spun.

According to another aspect there is provided a rotary device incorporating a bladed disc according to any of the options discussed above, and optionally wherein the rotary device is an engine, further optionally a turbine engine.

According to another aspect there is provided a method of manufacturing a bladed disc according to any one of the options discussed above, the method comprising machining the bladed disc from a single piece of material. According to another aspect, there is provided a method of manufacturing a bladed disc according to any one of the options discussed above, the method comprising attaching the blades to the rim.

Figure 2:
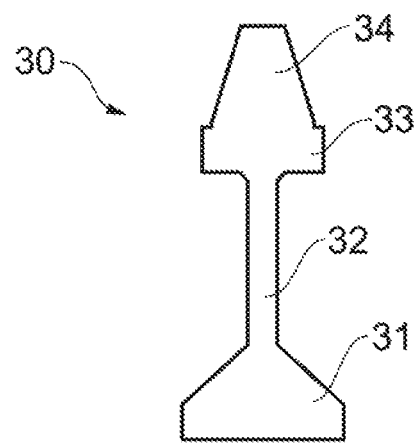
Figure 3:
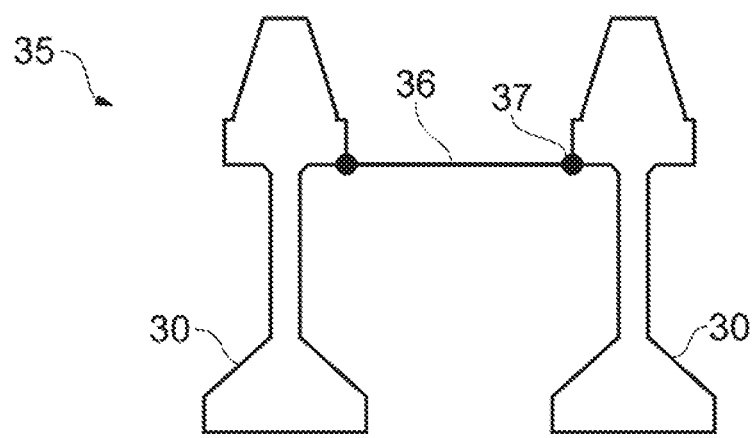
Figure 4:
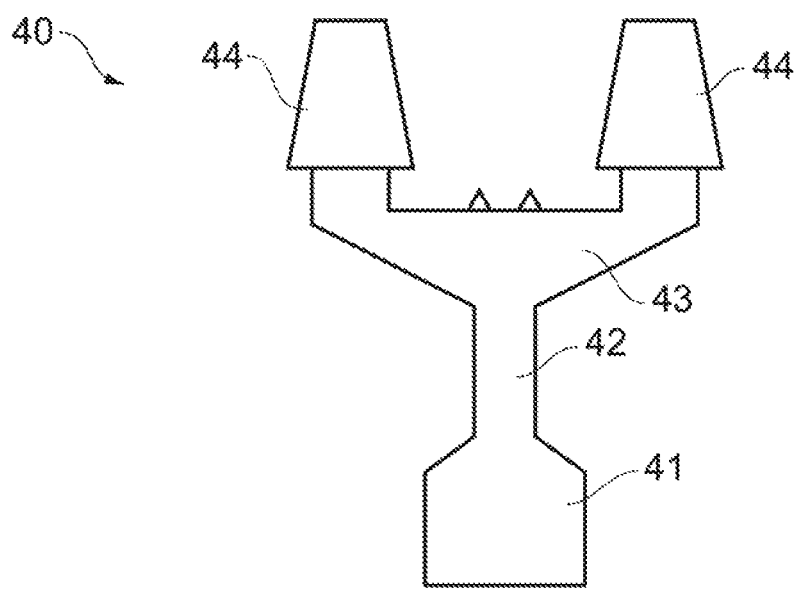
Figure 5:
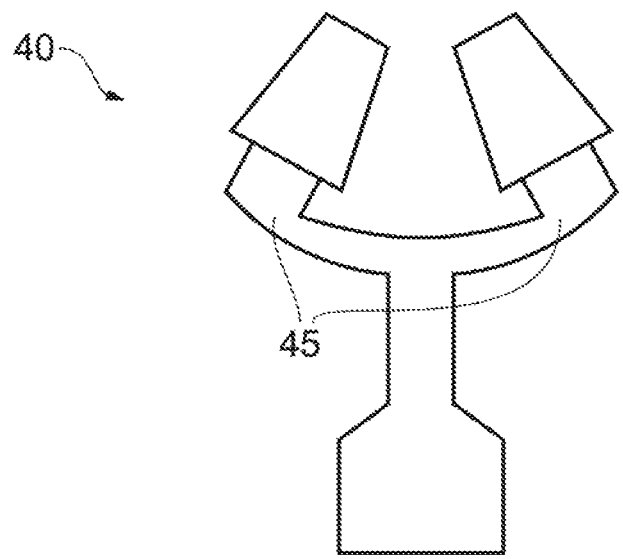
Figure 6:
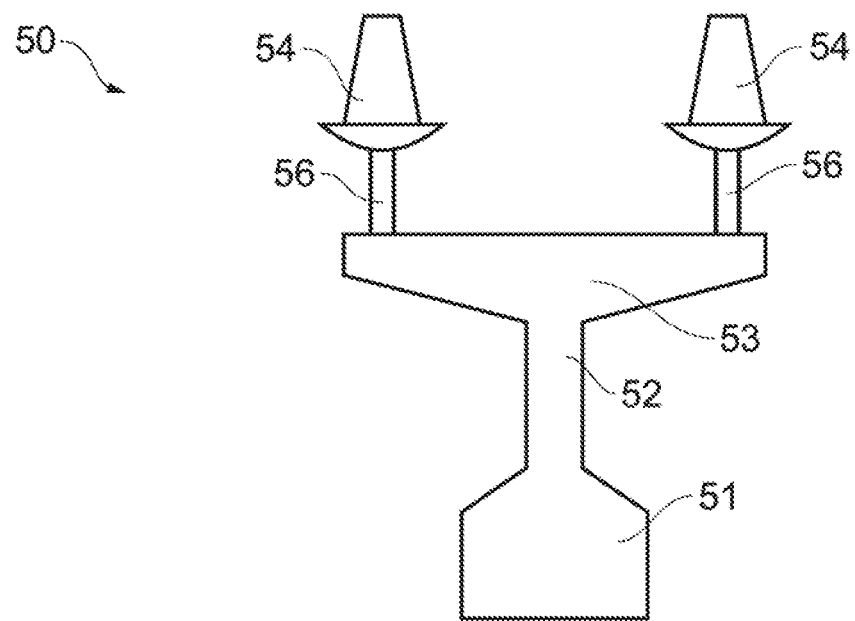
Figure 7:
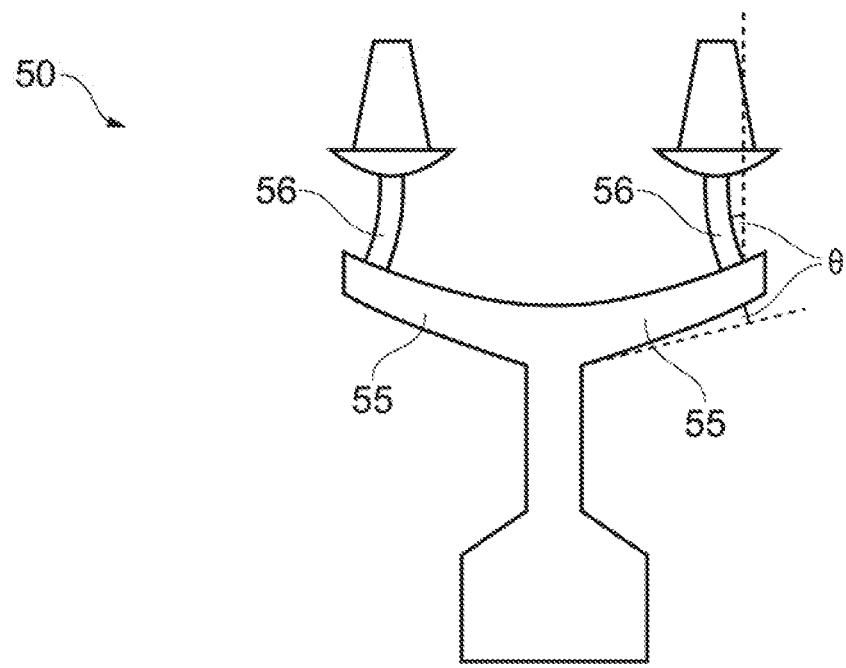

The invention is discussed below, by way of non-limiting example only, with reference to the accompanying Figures, in which:

FIG. 1 is cross sectional view through a rotary device;
FIG. 2 is a cross sectional view through a bladed disc;
FIG. 3 is a cross section through two bladed discs joined together to form a compressor drum;
FIG. 4 is a cross section through a bladed disc having two rows of blades;
FIG. 5 is a cross section through the bladed disc of FIG. 4, when the bladed disc is spinning;
FIG. 6 is a cross section through an alternative bladed disc having two rows of blades; and
FIG. 7 is a cross section through the bladed disc of FIG. 6 when it is spinning.

With reference to FIG. 1, a ducted fan gas turbine engine 10, which is an example of a rotary device, has a principal and rotational axis X-X. The engine 10 comprises, in axial flow series, an air intake 11, a propulsive fan 12, an intermediate pressure compressor 13, a high pressure compressor 14, combustion equipment 15, a high-pressure turbine 16, and intermediate pressure turbine 17, a low-pressure turbine 18 and a core engine exhaust nozzle 19. The engine also has a bypass duct 22 and a bypass exhaust nozzle 23. The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

In particular, the high and intermediate pressure compressors 14, 13 can each include several rows of rotating blades attached to rotor discs. Conventionally, a single row of blades and associated rotor disc could be formed integrally as a bladed disc, and several bladed discs could be provided where several rows of blades are required.

FIG. 2 illustrates a cross section through (one half) of a bladed disc 30. The cross section is taken radially—i.e. in the orientation of FIG. 2 the centre of the overall bladed disc would be below the drawing, and the axis of rotation would run from left to right. In use, the bladed disc 30 as shown in FIG. 2 would rotate into, or out of the page.

The bladed disc 30 comprises blades 34 connected to a rotor disc. The rotor disc has a central cob 31. Attached to the cob 31, and extending around it (above it, in FIG. 2), is a diaphragm 32. The diaphragm 32 extends in a radial direction away from the cob 32. The diaphragm 32 terminates at, and connects to, a rim 33. The blades 34 are attached to the rim 33 of the rotor disc.

FIG. 3 illustrates how two bladed discs 30 can be joined to form a compressor drum 35. Again, the figure is a radial cross section, like FIG. 2. An annular drum section 36 is attached, e.g. by welding, to the rim of each bladed disc 30.

However, it is possible to avoid the additional joining of parts that is required, for example, in the scenario of FIG. 3 by providing two rows of blades on a single bladed disc. The advantages of such a design include that (i) the compressor is less expensive to manufacture because there is one forging, one part and less welding is required; (ii) the bladed disc can be lighter, because there is less mass due to the absence of the additional cob/diaphragm portion; and (iii) access is improved, e.g. for bolting, because there are less diaphragms within the component—this is particularly advantageous on smaller compressors.

FIG. 4 shows an example of a bladed disc 40 having two rows of blades 44. The rotor disc of the bladed disc 40 is similar to that of bladed disc 30. That is, it has a central cob 41 surrounded by a main diaphragm 42. The diaphragm extends radially away from the cob to rim 43.

However, rim 43 is wider than for a conventional bladed disc, because two rows of blades 44 are connected to the same rim 43. As such, the rim has two sides 45 (as indicated in FIG. 5), extending outwardly away from the diaphragm in opposite directions. That is, the sides 45 extend in the direction of the axis of rotation. In FIGS. 4 and 5, the sides 45 appear as "arms" extending to the left and right. However, when considering the full 3D structure, the sides are effectively tubular sections (although they need not be perfectly annular as shown in FIG. 4, the lower surface of each of the "arms" is angled with respect to the upper surface).

As shown in FIG. 4, one row of blades 44 is attached to the end of each side 45 of rim 43. Preferably, the centres of mass of each row of blades are arranged such that the centre of mass of the overall bladed disc 40 is substantially aligned with a centre line of the diaphragm 42. As such, this reduces any moment applied to the bladed disc 40 due to the centrifugal force (and also aerodynamic forces) encountered when the bladed disc 40 is spinning.

The bladed disc 40 of FIG. 4 provides advantages compared to the compressor drum of e.g. FIG. 3. By reducing the number of underlying rotor discs, the overall structure is lighter, and therefore allows for a more efficient engine. Further, access around the diaphragm is improved, and the overall manufacturing is easier and cheaper because there is only one overall part.

However, in some scenarios, during use, it is possible that the rim sides 45 of the bladed disc 40 will bend. This is shown in FIG. 5. This would occur if the centrifugal forces acting on the rim create a bending moment strong enough to overcome the stiffness of the rim 43 to push the ends of the sides 45 in an outward direction. As a result, it is possible for the extended sides 45 of the rim 43 to flex radially outwards (upwards in FIG. 5). As a result, the blades 44 attached to the sides 45 of the rim 43 would exhibit a phenomenon called "rolling". That is, the blades would "roll" inwards (in the horizontal direction of FIG. 5) towards the centre line of the diaphragm 42 and the overall bladed disc 40, due to the bending moment caused by the centrifugal forces. Further, a resultant force from the flow of fluid through the compressor would also contribute to this rolling. A bladed disc 40 is particularly susceptible to the rolling phenomenon when working particularly hard, e.g. at takeoff for bladed discs within aircraft engines, as compared to at cruising.

Whilst the rolling phenomenon is undesirable in itself, as it changes the alignment of the blades 44, it can also lead to the blades abrading a portion of the surrounding casing. The degree of rolling will dictate where the casing is abraded, but the result of such abrasion is an increase in tip clearance between the ends of the blades 44 and the surrounding casing, which in turn reduces engine performance. Of course, such contact between the blades 44 and the casing also increases the risk of damage to the blades 44 themselves, which is also undesirable.

One approach to avoiding the rolling phenomenon is to stiffen the rim 43, e.g. by adding additional material. However, stiffening rim 43 increases the weight of the overall bladed disc 40, and therefore increases running costs.

A surprising alternative solution to the rolling phenomenon is illustrated in FIGS. 6 and 7.

FIG. 6 depicts a bladed disc 50, which is similar to bladed disc 40. That is, the bladed disc 50 two rows of blades 54 attached to a single rotor disc. The rotor disc comprises a central cob 51, surrounded by a main diaphragm 52. Main diaphragm 52 radially extends from the cob 51 to a rim 53. Rim 53 has two sides, extending away from the diaphragm 52 in the direction of the axis of rotation of the overall bladed disc 50.

In contrast to the arrangement of FIG. 4, the bladed disc 50 has mini-diaphragms 56, which attach the blades 54 to the end of each side 55 of the rim 53. That is, each blade 54 is connected to a side 55 of rim 53 via a mini-diaphragm 56. In some cases, multiple blades 54 within the same row could be connected to the side 55 of the rim 53 via the same diaphragm 56. In other cases, each individual blade could be connected to a side 55 of the rim 53 via an individual mini-diaphragm 56.

The arrangement of FIG. 6 provides the same benefits as the arrangement of FIG. 4. That is, bladed disc 50 provides benefits in terms of reduced weight, and ease of access and machining.

However, in addition, the bladed disc 50 exhibits self-correcting behaviour in scenarios that might otherwise cause rolling. As shown in FIG. 7, when bladed disc 50 is spinning, it is still possible for sides 55 of rim 53 to flex radially outwards (upwards in FIG. 7). However, blades 54 are not rigidly attached to the sides 55 of rim 53. Instead, they are attached by diaphragms 56, which are also able to bend. As such, in the same way that the centrifugal forces cause a bending moment that urges the laterally inward rolling of the blades 54, the centrifugal forces encountered by the blades 54 themselves cause a separate bending moment on the mini-diaphragms 56. As the centrifugal force on the blades 54 is also acting on the blades 54 in the radially outwards direction (upwards in FIG. 7) this causes a bending moment on the mini-diaphragms 56 acting to tilt the blades 54 back outwards (in a lateral direction). That is, the blades 54 are pushed back out to their original orientation (i.e. before the bladed disc was spun).

As a result of the blades 54 tilting back to their original orientation, the problems discussed above in connection with blade rolling are averted, or at least significantly reduced. That is, rubbing of the surrounding casing liner is caused to be similar across the chord of the aerofoil, which reduces any deep leading edge or trailing edge rubs, and tip clearance is minimised throughout the flight cycle.

Preferably, the mini-diaphragms 56 are designed such that they flex by an equal angle θ to the bending of the rim sides 55, in order to keep the blades 54 substantially upright. This can be tuned by adjusting the thickness of the min-diaphragm accordingly (a thinner mini-diaphragm 56 being more flexible than a thicker min-diaphragm 56). The specific thickness of the mini-diaphragm will depend upon the material of the bladed disc, and the dimensions of the rim (which will in turn affect the amount of deflection encountered by the rim during spinning). However, such dimensions can be calculated using standard modelling techniques, well known to the skilled person.

As is generally known, bladed disc-type rotors can be manufactured by milling from a solid material. Such manufacturing processes can also be used to manufacture the multi-row bladed discs discussed above. Aerofoil blades 44 can also be welded to the rotor disc rim 43 as an alternate manufacturing process. This can (i) improve access to the underside of the bladed disc 40, making any welding and subsequent machining of the bladed disc 40 much easier, (ii) improve assembly access to allow any bolted joints to be assembled and torque, (iii) allow the compressor length to be reduced for optimum performance, minimum weight and drag (whereas, in contrast, current compressor length can be constrained/increased by the need to allow suitable tooling access to the bolted joint), (iv) allow improved access for instrumentation lead-out on test engines, and (v) allow two blade rows to be manufactured from one forging (when milling from a single piece), which removes the need to weld or bolt adjacent blade rows together, and can thus allow two blade rows to be manufactured from "non-weldable" materials without the cost, weight and length increase associated with a bolted joint at every blade row.

The above description is provided by way of example only. The scope of the invention is defined in the claims. Variations within that scope will be apparent to the skilled person. For example, although the invention has only been discussed with respect to the provision of two rows of blades, greater number of rows (e.g. three or more) could be provided.

The invention claimed is:

1. A bladed disc for use in a turbine engine comprising:
a central cob portion;
a main diaphragm attached to, and extending around, the cob portion;
a rim surrounding the main diaphragm, the rim having opposed sides that extend away from the main diaphragm in a direction of an axis of rotation of the bladed disk, the opposed sides being configured to roll laterally inward toward one another due to a centrifugal force encountered when the bladed disc is spun; and
two rows of blades attached to the respective opposed sides of the rim, wherein the blades are attached to the rim via bendable mini-diaphragms, the blades having a first orientation before the bladed disc is spun,
wherein the bendable mini-diaphragms are configured to bend laterally outward due to the centrifugal force encountered when the bladed disc is spun, thereby allowing the blades to tilt back to the first orientation.

2. The bladed disc according to claim 1, wherein each blade is attached to the rim by a separate mini-diaphragm.

3. The bladed disc according to claim 1, wherein a plurality of blades within a row are attached to the rim by the same mini-diaphragm.

4. The bladed disc according to claim 1, wherein the two rows of blades are positioned such that the centre of mass of the bladed disc is aligned with a centre line of the main diaphragm.

5. The bladed disc according to claim 1, wherein the mini-diaphragms are configured to bend by the same angle as the rim side supporting the mini-diaphragms, when the bladed disc is spun.

6. The bladed disc according to claim 1, wherein the thickness of the mini-diaphragms is selected such that the blades remain in the same radial orientation when the bladed disc is spun.

7. A gas turbine engine incorporating the bladed disc according to claim 1.

8. A bladed disc for use in a turbine engine comprising:
a central cob portion;
a main diaphragm attached to, and extending around, the cob portion;
a rim surrounding the main diaphragm; and
two rows of blades attached to the rim, wherein the blades are attached to the rim via bendable mini-diaphragms,
wherein the rim comprises two sides extending away from the main diaphragm, and wherein one of said two rows of blades is attached to each one of the two sides, the two sides being configured to roll laterally inward toward one another due to a centrifugal force encountered when the bladed disc is spun, and
wherein the mini-diaphragms are configured to bend by the same angle as the rim sides supporting the mini-diaphragms due to the centrifugal force encountered when the bladed disc is spun.

9. A bladed disc for use in a turbine engine comprising:
a central cob portion;
a main diaphragm attached to, and extending around, the cob portion;
a rim surrounding the main diaphragm, the rim having opposed sides that extend away from the main diaphragm in a direction of an axis of rotation of the bladed disk, the opposed sides being configured to roll laterally inward toward one another due to a centrifugal force encountered when the bladed disc is spun; and
two rows of blades attached to the respective opposed sides of the rim, wherein the blades are attached to the rim via bendable mini-diaphragms, the blades having a first orientation before the bladed disc is spun, and
wherein the thickness of the bendable mini-diaphragms is selected such that the blades remain in the first orientation when the centrifugal force is encountered when the bladed disc is spun.

* * * * *